US012761817B2

(12) United States Patent
Yun et al.

(10) Patent No.: US 12,761,817 B2
(45) Date of Patent: Oct. 13, 2026

(54) DATA STORAGE DEVICE AND METHOD OF OPERATING THE SAME

(71) Applicant: SK hynix Inc., Gyeonggi-do (KR)

(72) Inventors: Geon Ho Yun, Gyeonggi-do (KR); Min Hwan Moon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/974,824

(22) Filed: Dec. 10, 2024

(65) Prior Publication Data

US 2025/0362817 A1 Nov. 27, 2025

(30) Foreign Application Priority Data

May 21, 2024 (KR) ........................ 10-2024-0065914

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC .... G06F 3/0625; G06F 3/0659; G06F 3/0679; G06F 3/061; G06F 3/0688; G06F 3/0604; G06F 3/0614; G06F 3/0658
USPC .................................................. 711/154, 103
See application file for complete search history.

(56) References Cited

U.S. PATENT DOCUMENTS

| | | | | |
|---|---|---|---|---|
| 2012/0185706 A1* | 7/2012 | Sistla | G06F 1/3206 713/300 |
| 2019/0065086 A1* | 2/2019 | Margetts | G06F 13/1668 |
| 2020/0409441 A1* | 12/2020 | Hatch | G06F 1/3268 |
| 2021/0109587 A1* | 4/2021 | Mukker | G06F 1/3268 |
| 2022/0091649 A1* | 3/2022 | Knoth | G06F 1/28 |

FOREIGN PATENT DOCUMENTS

| | | | |
|---|---|---|---|
| KR | 10-2017-0027556 A | 3/2017 |
| KR | 10-2019-027677 A | 3/2019 |
| KR | 10-2019-0109872 A | 9/2019 |
| KR | 10-2022-0135786 A | 10/2022 |

* cited by examiner

*Primary Examiner* — Hashem Farrokh
(74) *Attorney, Agent, or Firm* — IP&T GROUP LLP

(57) ABSTRACT

Provided herein may be a data storage device for efficiently controlling performance and a method of operating the same. The data storage device may include a plurality of memory dies, a command storage configured to store commands, a credit information generator configured to generate and store maximum credit information indicating, for each command type, a maximum number of commands that are capable of being simultaneously performed by the plurality of memory dies, and a performance manager configured to provide the commands to the plurality of memory dies so that the plurality of memory dies process a number of commands greater than or equal to the maximum credit information.

20 Claims, 10 Drawing Sheets

| Max Credit Information | | |
|---|---|---|
| Program | Erase | Read |
| Program Max Credit | Erase Max Credit | Read Max Credit |

Erase Max Credit ≤ Program Max Credit < Read Max Credit

FIG. 6

| Max Credit Information | | |
|---|---|---|
| Program | Erase | Read |
| Program Max Credit 1 | Erase Max Credit 1 | Read Max Credit 1 |
| Program Max Credit 2 | Erase Max Credit 2 | Read Max Credit 2 |

Erase Max Credit 1 ≤ Program Max Credit 1 < Read Max Credit 1
Erase Max Credit 2 ≤ Program Max Credit 2 < Read Max Credit 2
Erase Max Credit 1 > Erase Max Credit 2
Program Max Credit 1 > Program Max Credit 2
Read Max Credit 1 ≥ Read Max Credit 2

Command Queue

| Index | Command | Die |
|---|---|---|
| 1 | Erase | 1 |
| 2 | Erase | 6 |
| 3 | Erase | 7 |
| 4 | Erase | 10 |
| 5 | Program | 2 |
| 6 | Program | 5 |
| 7 | Program | 9 |
| 8 | Read | 3 |
| 9 | Read | 4 |
| 10 | Read | 15 |
| ... | ... | |

Credit Information Generator

| | Program | Erase | Read |
|---|---|---|---|
| Max Credit Info. | 2 | 2 | 16 |
| Issue CMD Info. | 0 | 0 | 0 |

Command Queue

| Index | Command | Die |
|---|---|---|
| 1 | | |
| 2 | | |
| 3 | Erase | 7 |
| 4 | Erase | 10 |
| 5 | | |
| 6 | | |
| 7 | Program | 9 |
| 8 | | |
| 9 | | |
| 10 | | |
| ... | ... | |

Credit Information Generator

| | Program | Erase | Read |
|---|---|---|---|
| Max Credit Info. | 2 | 2 | 16 |
| Issue CMD Info. | 2 | 2 | 3 |

Command Queue

| Index | Command | Die |
|---|---|---|
| 1 | | |
| 2 | | |
| 3 | | |
| 4 | | |
| 5 | | |
| 6 | | |
| 7 | | |
| 8 | | |
| 9 | | |
| 10 | | |
| ⋮ | ⋮ | |

Credit Information Generator

| | Program | Erase | Read |
|---|---|---|---|
| Max Credit Info. | 2 | 2 | 16 |
| Issue CMD Info. | 1 | 2 | 0 |

DATA STORAGE DEVICE AND METHOD OF OPERATING THE SAME

CROSS-REFERENCE TO RELATED APPLICATION

The present application claims priority under 35 U.S.C. § 119(a) to Korean patent application number 10-2024-0065914 filed on May 21, 2024, the entire disclosure of which is incorporated by reference herein.

BACKGROUND

1. Field of Invention

Various embodiments of the present disclosure generally relate to a data storage device and a method of operating the data storage device, and more particularly to a data storage device for efficiently controlling performance and a method of operating the data storage device.

2. Description of Related Art

A data storage device may include a memory device in which data is stored and a controller which controls the memory device. The memory device may include a plurality of memory dies, and each of the memory dies may process a program operation of storing data, a read operation of reading stored data or an erase operation of erasing stored data under the control of the controller. The plurality of memory dies may be simultaneously or separately operated. As the number of simultaneously operating memory dies increases, a peak current consuming higher power may occur. When peak currents occur concurrently in respective memory dies, there is a risk of malfunctioning due to exceeding the allowed maximum peak current, thus requiring control for such malfunctioning.

SUMMARY

Various embodiments of the present disclosure are directed to a data storage device for efficiently controlling performance and a method of operating the data storage device.

An embodiment of the present disclosure may provide for a data storage device. The data storage device may include a plurality of memory dies, a command storage configured to store commands, a credit information generator including maximum credit information indicating a number of commands that are capable of being simultaneously processed for each command type, and a performance manager configured to provide the commands to the plurality of memory dies to process a number of commands less than or equal to the maximum credit information.

An embodiment of the present disclosure may provide for a data storage device. The data storage device may include a plurality of memory dies, a command storage configured to store commands, a credit information generator configured to store information about a first maximum credit indicating a maximum number of commands that are capable of being simultaneously processed and a second maximum credit less than the first maximum credit, and a performance manager configured to provide the commands to the plurality of memory dies based on one of the first maximum credit and the second maximum credit depending on a temperature of each of the plurality of memory dies.

An embodiment of the present disclosure may provide for a controller. The controller may include a host interface configured to communicate with a host, a memory interface configured to communicate with a memory device, and a processor configured to control the host interface and the memory interface, wherein the processor is configured to generate a plurality of commands, each corresponding to a request received from the host, and control the memory interface to provide the generated commands to the memory device based on a maximum credit indicating a number of commands that are capable of being simultaneously processed by the memory device depending on a type of the command, and issue command information indicating a number of commands of a type identical to a type of the command being processed by the memory device.

BRIEF DESCRIPTION OF THE DRAWINGS

FIG. 6 is a diagram illustrating the maximum credit information of FIG. 4 according to another embodiment of the present disclosure.

DETAILED DESCRIPTION

Specific structural or functional descriptions of the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in this specification.

Hereinafter, various embodiments of the present disclosure will be described in detail with reference to the accompanying drawings in which embodiments of the present disclosure are shown so that those skilled in the art to which the present disclosure pertains can easily practice the technical spirit of the present disclosure.

Figure 1:
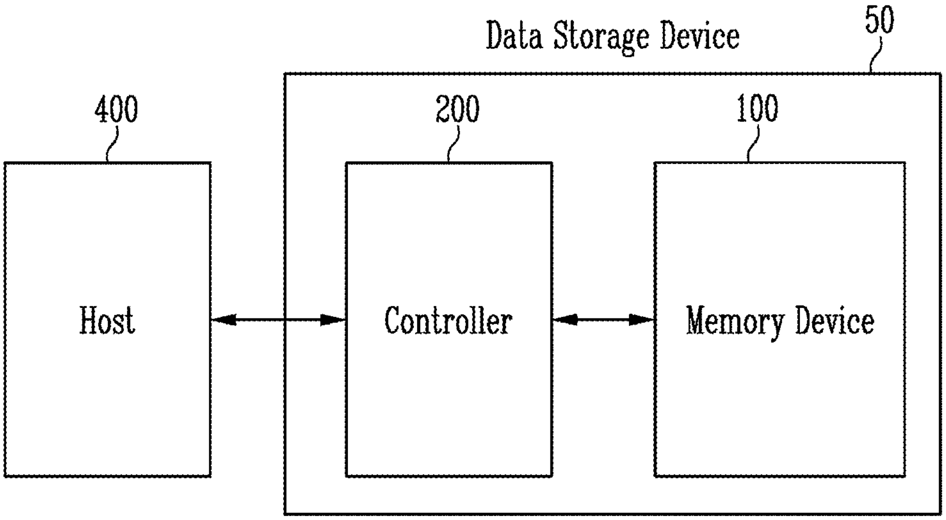
FIG. 1 is a diagram illustrating a data storage device including a memory device.

FIG. 1 is a diagram illustrating a data storage device 50 including a memory device.

Referring to FIG. 1, the data storage device 50 may include a memory device 100 and a controller 200. The data storage device 50 may be a device which stores data under the control of a host 400, such as a mobile phone, a smartphone, a laptop computer, a desktop computer, a game console, a smart television (TV), a tablet PC, or an invehicle infotainment system. In an embodiment, the data storage device 50 may be a device such as a server or a data center, controlled by the host 400, through wired and wireless communication for storing data at a remote place.

The data storage device 50 may interface with the host 400 through various communication methods, and may be implemented as various devices depending on the interfacing methods. For example, the data storage device 50 may be implemented as any of various types of storage devices, such as a solid state drive (SSD), an embedded multimedia card (eMMC), a secure digital (SD), mini-SD, or micro-SD-type secure digital card, a universal serial bus (USB) storage device, a universal flash storage (UFS) device, a personal computer memory card international association (PCMCIA) card-type storage device, a peripheral component interconnection (PCI) card-type storage device, a PCI express (PCI-e or PCIe) card-type storage device, a compact flash (CF) card, and a smart media card.

In an embodiment, the data storage device 50 may be manufactured in any of various types of package forms. For example, the data storage device 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated in response to the control of the controller 200. The memory device 100 may include one or more memory dies. Each memory die may be the unit by which an operation can be independently performed.

Each of the one or more memory dies included in the memory device 100 may include a plurality of memory cells in which data is stored.

Each of the memory cells may store one data bit or a plurality of data bits.

The memory cells may be accessed in units of a preset size depending on the type of memory device. The units in which the memory cells are accessed may differ for respective operations. For example, the memory cells may be accessed in different size units for a write operation (program operation) of storing data in each memory cell, a read operation of sensing data stored in each memory cell, and an erase operation of erasing data stored in each memory cell.

In an embodiment, required power and time may vary depending on the type of operation. For example, the read operation may have lower power and shorter processing time compared to the program operation or the erase operation. The erase operation may have higher power compared to the program operation, and may have the longest processing time.

In an embodiment, each of the one or more memory dies included in the memory device 100 may be a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus DRAM (RDRAM), a NAND flash memory, a vertical NAND flash memory, a NOR flash memory, a resistive RAM (RRAM), a phase-change memory (PCM), a magnetoresistive RAM (MRAM), a ferroelectric RAM (FRAM), or a spin transfer torque RAM (STT-RAM).

Each of the one or more memory dies included in the memory device 100 may receive a command and an address from the controller 200, and may access the area selected by the address in a memory cell array included in the corresponding memory die. The memory die may perform an operation indicated by the command on the area selected by the address. For example, the memory die may perform a write operation (program operation), a read operation, and an erase operation. During a program operation, the memory die may write data to the area selected by the address. During a read operation, the memory die may sense data from the area selected by the address. During an erase operation, the memory die may erase data stored in the area selected by the address.

The controller 200 may control the overall operation of the data storage device 50.

When power is applied to the data storage device 50, the controller 200 may run firmware (FW). The data storage device 50 may translate a logical address provided by the host 400 into a physical address used by the memory device 100.

The controller 200 may control the memory device 100 to perform a write operation, a read operation or an erase operation in response to a request received from the host 400. During the write operation, the controller 200 may provide a write command (program command), an address, and data to the memory device 100. During the read operation, the controller 200 may provide a read command and an address to the memory device 100. During the erase operation, the controller 200 may provide an erase command and an address to the memory device 100.

In an embodiment, the controller 200 may include an error correction code (ECC) processor. Alternatively, the ECC processor may be included, as a chip or a device separate from the controller 200, in the data storage device 50. The ECC processor may detect and correct errors contained in data obtained from the memory die included in the memory device 100 through a read operation. In an embodiment, the number of bits that can be corrected by the ECC processor may be limited.

Figure 2:
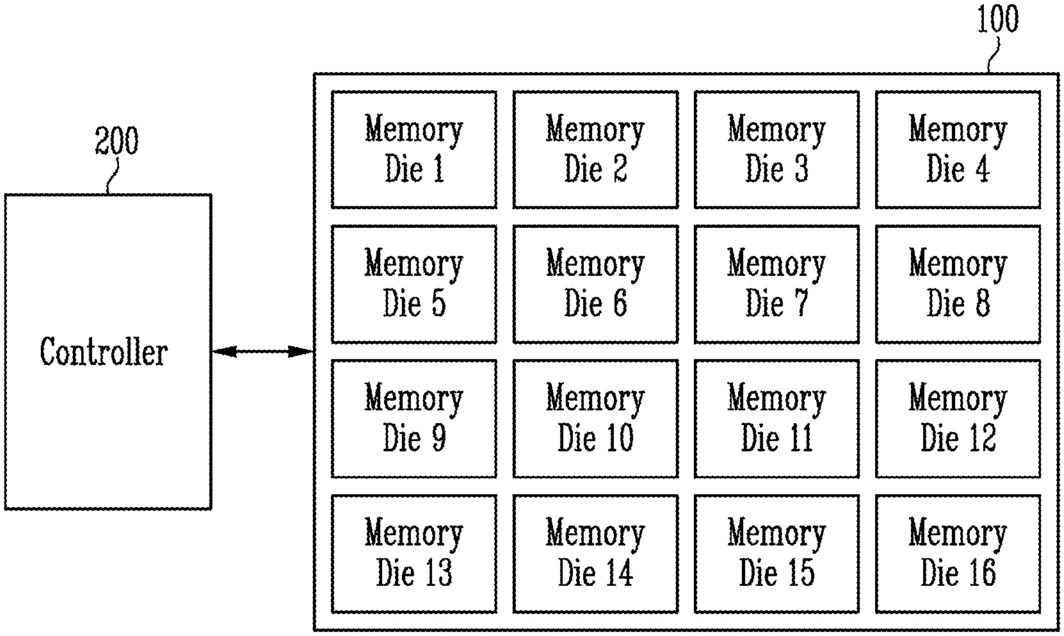
FIG. 2 is a diagram illustrating memory dies included in the memory device of FIG. 1.

FIG. 2 is a diagram illustrating memory dies included in the memory device 100 of FIG. 1.

Referring to FIG. 2, the memory device 100 may include a plurality of memory dies. Although the memory device 100 is illustrated as including first to sixteenth memory dies (Memory Die 1 to Memory Die 16) in FIG. 2, the number of memory dies included in the memory device 100 is not limited to 16. In some embodiments, the memory device 100 may include 4, 8, 12, 32 or 64 memory dies.

Each memory die may be the unit by which an operation is independently performed. The first to sixteenth memory dies (Memory Die 1 to Memory Die 16) may simultaneously or separately perform a program operation, a read operation, and an erase operation.

In an embodiment, one memory die may include a plurality of planes. When the memory die includes two or more planes, one plane may independently perform an operation.

In an embodiment, the first to sixteenth memory dies (Memory Die 1 to Memory Die 16) may be individually connected to the controller 200. In this case, the controller 200 may provide commands that individually instruct the first to sixteenth memory dies (Memory Die 1 to Memory Die 16) to perform operations.

In various embodiments, the first to sixteenth memory dies (Memory Die 1 to Memory Die 16) may be connected to the controller 200 through a plurality of channels connected in common thereto. For example, the controller 200 may be connected to the first to sixteenth memory dies (Memory Die 1 to Memory Die 16) through four channels. The first to fourth memory dies (Memory Die 1 to Memory Die 4) may be connected through a first channel, the fifth to eighth memory dies (Memory Die 5 to Memory Die 8) may be connected through a second channel, the ninth to twelfth memory dies (Memory Die 9 to Memory Die 12) may be connected through a third channel, and the thirteenth to sixteenth memory dies (Memory Die 13 to Memory Die 16) may be connected through a fourth channel. In this case, while any of the memory dies connected to the same channel is communicating with the controller 200, the remaining memory dies cannot communicate with the controller 200 through the same channel, but the memory dies connected to the remaining channels may communicate with the controller 200.

In an embodiment, the first to sixteenth memory dies (Memory Die 1 to Memory Die 16) may be operated in an interleaving manner. The interleaving scheme may be an operating scheme in which some periods during which the first to sixteenth memory dies (Memory Die 1 to Memory Die 16) perform operations overlap each other.

As the number of simultaneously operating memory dies among the first to sixteenth memory dies (Memory Die 1 to Memory Die 16) increases, the intensity of power required for operation may increase. The intensity of power consumed by the data storage device 50 may vary depending on the types of operations performed by the first to sixteenth memory dies (Memory Die 1 to Memory Die 16). Generally, an erase operation may require the highest power, a program operation may require the second highest power, and a read operation may require the lowest power. Therefore, in the case where all of the first to sixteenth memory dies (Memory Die 1 to Memory Die 16) perform the erase operation or the program operation, relatively high power may be consumed compared to the case where all of the first to sixteenth memory dies (Memory Die 1 to Memory Die 16) perform the read operation.

Therefore, the peak value of power consumed by the data storage device 50 may be associated with the type of operation performed by the first to sixteenth memory dies (Memory Die 1 to Memory Die 16). When the memory dies simultaneously perform operations, peak currents may occur concurrently in respective memory dies. In this case, when a period during which consumed power exceeds peak power occurs due to exceeding the allowed maximum peak current, malfunctioning may occur.

When the number of memory dies that simultaneously perform operations among the memory dies included in the data storage device 50 increases, the internal temperature of the memory device 100 may increase. As the internal temperature exceeds a certain level, malfunctioning may occur. Therefore, the data storage device 50 may have a performance control function of limiting performance to decrease the temperature when the internal temperature exceeds a preset reference temperature.

When the performance of all operations is suspended for a certain time due to the temperature of the memory device 100 exceeding the reference temperature, the performance of the data storage device 50 may not be exhibited at all during the time. For example, in the case of the read operation, the intensity of required power is relatively low, and thus there may be no need to suspend the performance of the read operation even if the internal temperature of the memory device 100 exceeds the reference temperature.

In an embodiment of the present disclosure, there are presented a data storage device and a method of operating the data storage device, which may guarantee minimum operating performance even in the case of performance limitation by separately managing the number of memory dies that can be simultaneously operated depending on the type of operation. A process of managing the number of memory dies that can be simultaneously operated depending on the type of operation may be managed through a scheme for controlling the number of commands to be provided by the controller 200 to the memory dies.

Figure 3:
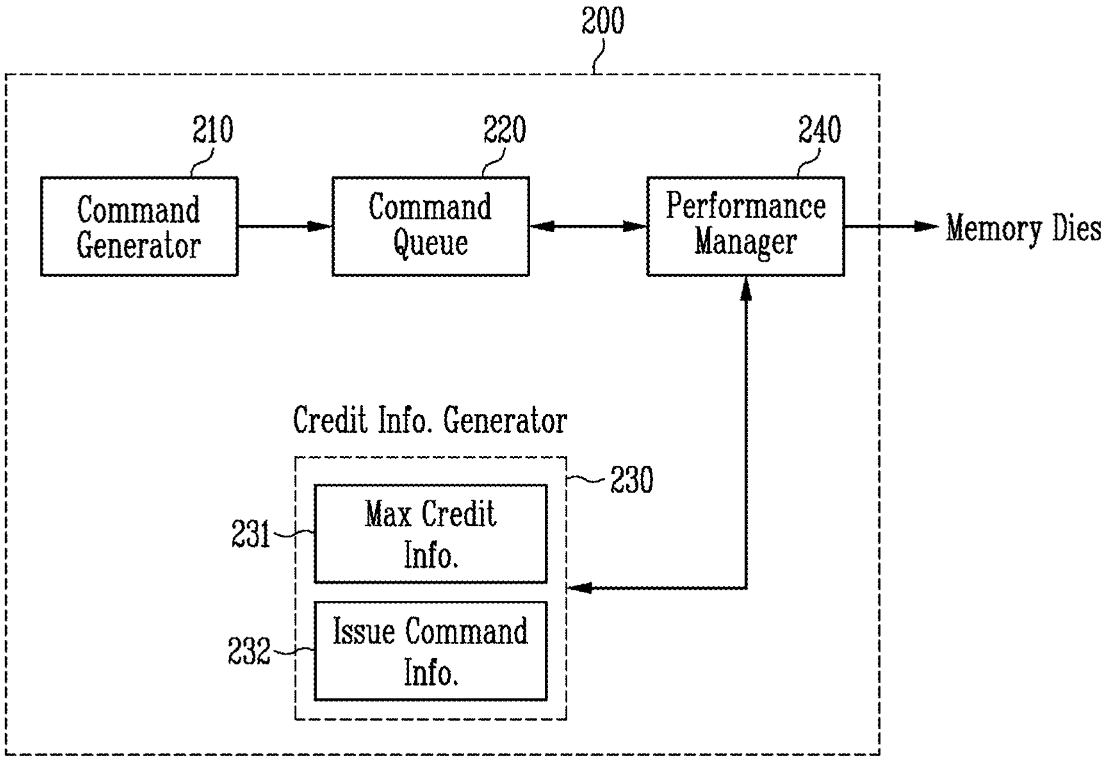
FIG. 3 is a diagram illustrating a controller of FIG. 1.

FIG. 3 is a diagram illustrating the controller 200 of FIG. 1.

Referring to FIG. 3, the controller 200 may include a command generator 210, a command queue 220, a credit information generator 230, and a performance manager 240.

Referring to FIGS. 1 to 3, the command generator 210 may generate commands to be processed by memory dies. In an embodiment, the command generator 210 may generate a program command, a read command, or an erase command in response to a request from the host 400, described above with reference to FIG. 1. In various embodiments, the command generator 210 may generate the program command, the read command or the erase command to perform background operations for managing the data storage device 50. The command generator 210 may enqueue the generated commands in the command queue 220.

The command queue 220 may store the commands generated by the command generator 210. In an embodiment, the command queue 220 may be referred to as a command storage. Although the command queue 220 may have a data structure of a circular queue, the structure of the command queue 220 is not limited to the circular queue. The command queue 220 may store the commands in the order in which the commands are generated by the command generator 210. For example, the commands may be enqueued in the command queue 220 in the order in which the commands are generated.

In an embodiment, the command queue 220 may sequentially provide the input commands to the performance manager 240. That is, the commands stored in the command queue 220 may be dequeued by the performance manager 240 in the order of input of the commands. However, according to an embodiment of the present disclosure, all of the commands may not be sequentially dequeued, but the commands may be selectively dequeued based on maximum (max) credit information 231 and issue command information 232 stored in the credit information generator 230.

The credit information generator 230 may store the maximum (max) credit information 231 and the issue command information 232.

The maximum credit information 231 may be information about a maximum credit indicating the number of commands that can be simultaneously processed. In an embodiment, the maximum credit information 231 may be a maximum value for the number of commands that can be simultaneously performed depending on the types of commands. For example, the maximum credit information 231 may include maximum credits respectively corresponding to a program operation, an erase operation, and a read operation. Because the program operation and the erase operation consume relatively high power compared to the read operation, maximum credits respectively corresponding to the program operation and the erase operation may be less than the maximum credit corresponding to the read operation.

In an embodiment, the maximum credit information 231 may include a first maximum credit that is used when the performance of the data storage device 50 is not limited, and a second maximum credit that is used when the performance of the data storage device 50 is limited. Each of the first maximum credit and the second maximum credit may include maximum credits respectively corresponding to the program operation, the erase operation, and the read operation.

In an embodiment, the maximum credit information 231 may be stored in one of the memory dies, and may then be loaded into the credit information generator 230 of the controller 200 when power is applied to the data storage device 50. The maximum credits included in the maximum credit information 231 may be values determined through experiments in a process of manufacturing the data storage device 50.

The issue command information 232 may be information indicating the number of commands provided to the memory dies and currently being processed. The issue command information 232 may include pieces of issue command information respectively corresponding to a program operation, an erase operation, and a read operation, in the same manner as the maximum credit information 231.

The performance manager 240 may manage the performance of the data storage device 50. The performance manager 240 may limit the performance of the data storage device 50 depending on the temperature of the memory device 100. For example, the performance manager 240 may receive information about temperature from the memory device 100, or may receive information about temperature from a temperature sensor (not illustrated) included in the controller 200. The performance manager 240 may not limit the performance of the data storage device 50 when the received temperature is lower than or equal to preset reference temperature. The performance manager 240 may limit the performance of the data storage device 50 when the received temperature is higher than the preset reference temperature.

In detail, when the received temperature is lower than or equal to the preset reference temperature, the performance manager 240 may provide the commands stored in the command queue 220 to the memory dies based on the first maximum credit. When the received temperature is higher than the preset reference temperature, the performance manager 240 may provide the commands stored in the command queue 220 to the memory dies based on the second maximum credit.

The performance manager 240 may select one of the commands stored in the command queue 220, and compare a maximum credit with an issue command value that correspond to the same type of command as the type of the selected command. Further, the performance manager 240 may provide the selected command to the memory dies only when the maximum credit is less than the issue command value.

The performance manager 240 may suspend provision of the selected command to the memory dies when the issue command value is equal to the maximum credit. When the issue command value is equal to the maximum credit, the performance manager 240 may suspend the provision of the selected command, and may select a command that is input subsequent to the selected command from among the commands stored in the command queue 220.

In an embodiment, the performance manager 240 may provide the selected command to the memory dies, and thereafter update the issue command information. For example, the performance manager 240 may increase the issue command value corresponding to the same type of command as the type of the provided command.

In an embodiment, the performance manager 240 may receive, from the memory dies, completion responses indicating that processing of the command has been completed, and may update the issue command information based on the completion responses. For example, the performance manager 240 may decrease the issue command value corresponding to the same type of command as the type of command for which the completion responses are received.

Figures 4, 5:
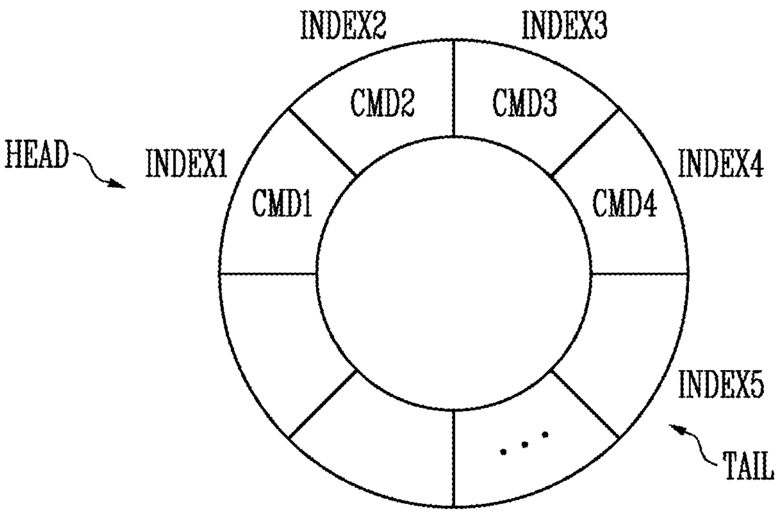
FIG. 4 is a diagram illustrating a command queue of FIG. 3.
FIG. 5 is a diagram illustrating maximum credit information of FIG. 4 according to an embodiment of the present disclosure.

FIG. 4 is a diagram illustrating the command queue 220 of FIG. 3.

Referring to FIG. 4, the command queue may have the data structure of a circular queue. The circular queue may be an array in which a head and a tail meet, and may be a data structure into and from which data can be inserted and deleted. A head index HEAD of the circular queue may indicate the start position of the circular queue. A tail index TAIL may indicate the end position of the circular queue. When the initial value of each of the head index HEAD and the tail index TAIL of the circular queue is 1 and the value of a position at which the next command to be input is to be stored is identical to the value of the tail, the circular queue may be construed as being empty or full.

In an initial state in which each of the values of the head index HEAD and the tail index TAIL is 1, an enqueue operation of inputting a new command may be performed. The input command may be stored in a storage space indicated by the tail index TAIL.

Referring to FIG. 4, eight available storage spaces are present in the circular queue and that a first command CMD1, a second command CMD2, a third command CMD3, and a fourth command CMD4 are stored in respective storage spaces corresponding to index 1 to index 4.

A command may be written to the space indicated by the tail index TAIL, and the value of the tail index TAIL may be increased by 1 whenever one command is stored. For example, the initial value of the head index HEAD may be 1, and the value of the tail index TAIL may be 5 after the first to fourth commands CMD1 to CMD4 are stored. That is, the tail index TAIL may indicate the space in which each command is to be stored. After the command is stored, the value of the tail index TAIL may be increased to indicate a space just subsequent to the corresponding space in which the command is stored. According to an embodiment, as the first command CMD1, the second command CMD2, the third command CMD3, and the fourth command CMD4 are sequentially stored, the tail index TAIL may be increased by 1 each time. As the fourth command CMD4 is written, the tail index TAIL may indicate index 5 that is a space just subsequent to the space in which the fourth command CMD4 is stored.

When the value of the tail index TAIL is identical to the value of the head index HEAD, the circular queue may be construed as being full. In an embodiment, a queue depth indicating the data accommodation capacity of the circular queue is limited, and thus the value of the tail index TAIL may be allocated using a wrap-around scheme for reusing an existing index. For example, when the queue depth of the circular queue is N, the value of the increased tail index TAIL is N, and thus the tail index TAIL may be 0 again. In this way, because the circular queue is characterized in that an index subsequent to the last index is the first index, whereby the circular queue is advantageous in a limited data space allocation environment, and implementation of the circular queue is facilitated.

FIG. 5 is a diagram illustrating maximum (max) credit information 231 of FIG. 4 according to an embodiment of the present disclosure.

Referring to FIG. 5, the maximum credit information may have different maximum credits depending on the types of commands. A maximum value for the number of program commands that can be simultaneously processed by memory dies may be a program maximum credit. A maximum value for the number of erase commands that can be simultaneously processed by the memory dies may be an erase maximum credit. A maximum number for the number of read commands that can be simultaneously processed by the memory dies may be a read maximum credit.

In the illustrated embodiment of FIG. 5, the erase maximum credit may be less than or equal to the program maximum credit, and the read maximum credit may be greater than the program maximum credit. For example, when the number of memory dies is 16, the erase maximum credit and the program maximum credit may be 2, and the read maximum credit may be 16.

FIG. 6 is a diagram illustrating the maximum (max) credit information 231 of FIG. 4 according to another embodiment of the present disclosure.

Referring to FIG. 6, the maximum credit information may include a first maximum credit and a second maximum credit. The first maximum credit may include a first program maximum credit Program Max Credit 1, a first erase maximum credit Erase Max Credit 1, and a first read maximum credit Read Max Credit 1. The second maximum credit may include a second program maximum credit Program Max Credit 2, a second erase maximum credit Erase Max Credit 2, and a second read maximum credit Read Max Credit 2.

In the illustrated embodiment of FIG. 6, the first erase maximum credit may be less than or equal to the first program maximum credit, and the first read maximum credit may be greater than the first program maximum credit. The second erase maximum credit may be less than or equal to the second program maximum credit, and the second read maximum credit may be greater than the second program maximum credit.

The first maximum credit may be a maximum credit used when the temperature of the memory device is lower than or equal to reference temperature. The second maximum credit may be a maximum credit used when the temperature of the memory device is higher than the reference temperature.

The first maximum credit may be greater than the second maximum credit. That is, as shown in FIG. 6, the first program maximum credit, the first erase maximum credit, and the first read maximum credit may be greater than the second program maximum credit, the second erase maximum credit, and the second read maximum credit, respectively. In an embodiment, the first read maximum credit and the second read maximum credit may have the same value. The reason for this is that, even if the temperature of the memory device exceeds the reference temperature, power required for a read operation is relatively low, and thus the performance of the read operation may not be limited.

For example, when the number of memory dies is 16, the first erase maximum credit and the first program maximum credit may be 8, and the first read maximum credit may be 16. The second erase maximum credit and the second program maximum credit may be 2, and the second read maximum credit may be 16.

Figure 7:
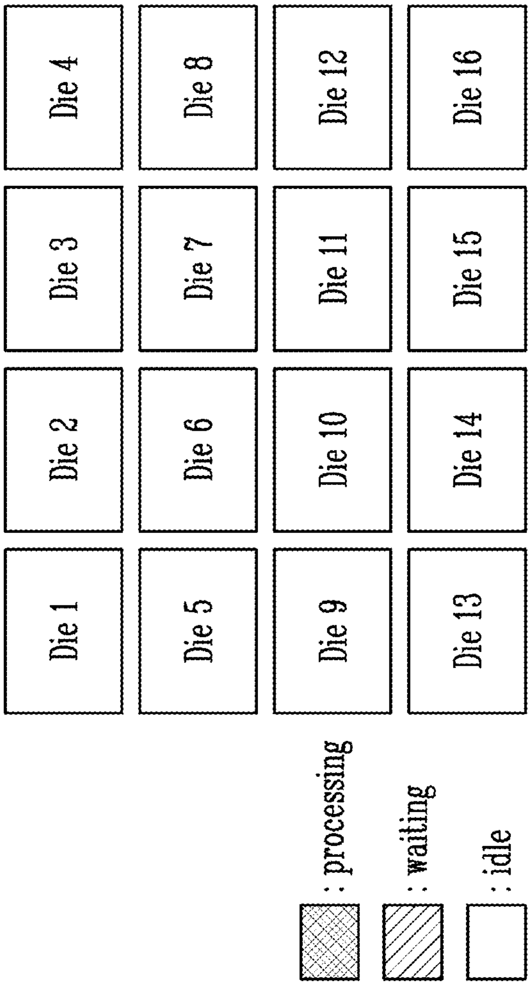
FIGS. 7 to 9 are diagrams illustrating a performance control operation according to an embodiment of the present disclosure.
Figure 8:
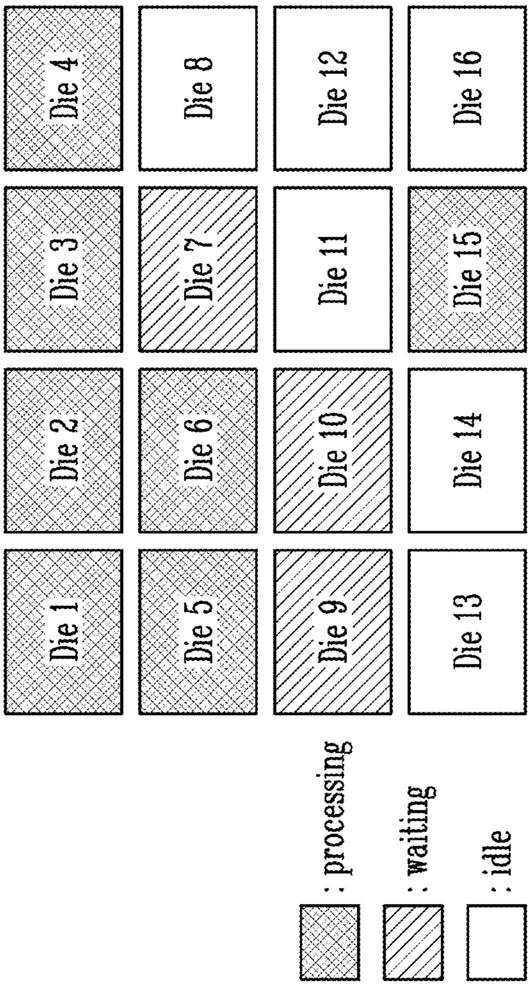
Figure 9:
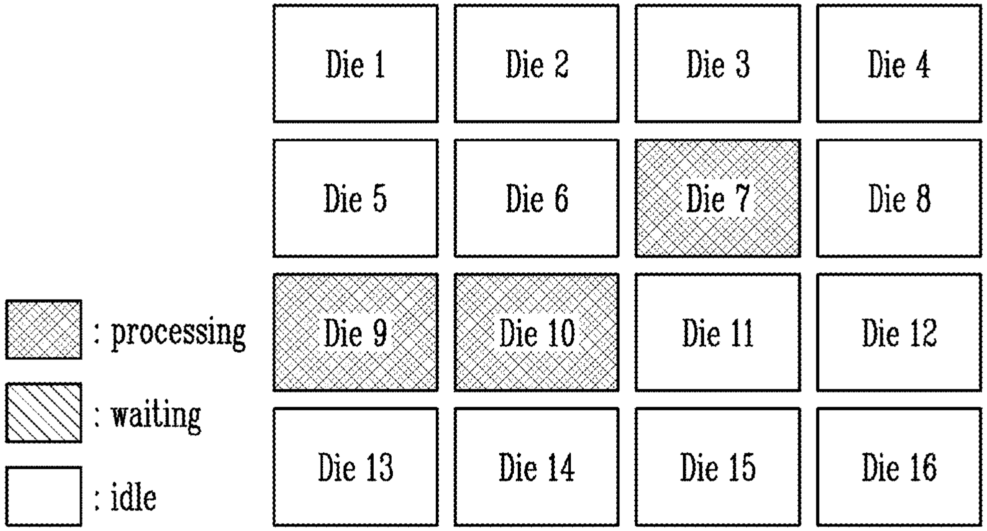

FIGS. 7 to 9 are diagrams illustrating a performance control operation according to an embodiment of the present disclosure.

FIGS. 7 to 9 are diagrams illustrating commands stored in a command queue in chronological order, issue command information stored in a credit information generator, and the states of respective memory dies. In FIGS. 7 to 9, each memory die shaded in gray may be a memory die that is processing a command, each memory die marked with diagonal hatching may be a memory die that is waiting for a command to be provided, and the remaining dies may be memory dies that are not processing a command, i.e., idle memory dies.

In FIG. 7, 10 commands are input to the command queue. The command queue may have the data structure of a circular queue, as in the case of the embodiment described with reference to FIG. 4.

In the illustrated example of FIG. 7, an erase command for a first die is input to a storage space or a region (position) corresponding to index 1, an erase command for a sixth die is input to a storage space corresponding to index 2, an erase command for a seventh die is input to a storage space corresponding to index 3, an erase command for a tenth die is input to a storage space corresponding to index 4, a program command for a second die is input to a storage space corresponding to index 5, a program command for a fifth die is input to a storage space corresponding to index 6, a program command for a ninth die is input to a storage space corresponding to index 7, a read command for a third die is input to a storage space corresponding to index 8, a read command for a fourth die is input to a storage space corresponding to index 9, and a read command for a fifteenth die is input to a storage space corresponding to index 10.

According to the maximum credit information stored in the credit information generator, a program maximum credit may be 2, an erase maximum credit may be 2, and a read maximum credit may be 16.

In FIG. 8, the performance manager 240, described with reference to FIG. 3, may select the erase command that is the command at index 1 as shown in FIG. 7. The performance manager 240 may compare the maximum credit of 2 for the erase command with an issue command value of 0 for the erase command, and may provide the erase command to the first die because the erase issue command value is less than the maximum credit. The performance manager 240 may provide the erase command to the first die, and thereafter update the erase issue command value of the issue command information from 0 to 1. In the same manner, the performance manager 240 may provide the erase command at index 2 to the sixth die, and thereafter update the erase issue command value of the issue command information from 1 to 2.

The performance manager 240 may next select the erase command at index 3 as shown in FIG. 7. Because, as a result of a comparison between the maximum credit of 2 for the erase command and the erase issue command value of 2, the erase issue command value is equal to the maximum credit (i.e., the erase issue command value is not less than the maximum credit), the performance manager 240 may suspend provision of the erase command at index 3 to the seventh die. In the same manner, the performance manager 240 may suspend provision of the erase command at index 4 to the tenth die.

The performance manager 240 may select the program command at index 5 as shown in FIG. 7. The performance manager 240 may compare the maximum credit of 2 for the program command with program issue command value of 0, and may provide the program command to the second die because the program issue command value is less than the maximum credit. The performance manager 240 may provide the program command to the second die, and thereafter update the program issue command value of the issue command information from 0 to 1. In the same manner, the performance manager 240 may provide the program command at index 6 to the fifth die, and thereafter update the program issue command value of the issue command information from 1 to 2.

The performance manager 240 may select the program command at index 7 as shown in FIG. 7. Because, as a result of a comparison between the maximum credit of 2 for the program command and the program issue command value of 2, the program issue command value is equal to the maximum credit (i.e., the program issue command value is not less than the maximum credit), the performance manager 240 may suspend provision of the program command at index 7 to the ninth die.

The performance manager 240 may select the read command at index 8 as shown in FIG. 7. The performance manager 240 may compare the maximum credit of 16 for the read command with read issue command value of 0, and may provide the read command to the third die because the read issue command value is less than the maximum credit. The performance manager 240 may provide the read command to the third die, and thereafter update the read issue command value of the issue command information from 0 to 1. In the same manner, the performance manager 240 may provide the read command at index 9 to the fourth die, and thereafter update the read issue command value of the issue command information from 1 to 2. Thereafter, the performance manager 240 may provide the read command at index 10 to the fifteenth die, and thereafter update the read issue command value of the issue command information from 2 to 3.

Because the maximum (max) credit indicating a maximum value for the number of commands that can be simultaneously processed is managed for the type of each command, the performance manager 240 may provide the program commands at index 5 and index 6 to the memory dies even in the state in which the provision of erase commands at index 3 and index 4 is suspended, and may provide read commands at index 8 to index 10 to the memory dies even in the state in which the provision of the program command at index 7 is suspended.

In FIG. 8, when the provided commands are processed by respective memory dies and the performance manager 240 receives a completion response, the performance manager 240 may update the issue command value. That is, whenever the completion response is received, the performance manger 240 may decrease the issue command value by 1.

In FIG. 9, the performance manager 240 may select the erase command at index 3 as shown in FIG. 8. Because the erase issue command value is less than the maximum credit as a result of a comparison between the maximum credit of 2 for the erase command and the erase issue command value of 0, the performance manager 240 may provide the erase command at index 3 to the seventh die. The performance manager 240 may provide the erase command to the seventh die, and thereafter update the erase issue command value of the issue command information from 0 to 1. In the same manner, the performance manager 240 may provide the erase command at index 4 to the tenth die, and thereafter update the erase issue command value of the issue command information from 1 to 2.

Thereafter, the performance manager 240 may select the program command at index 7 as shown in FIG. 8, may compare the maximum credit of 2 for the program command with the program issue command value of 0, and may provide the program command at index 7 to the ninth die because the program issue command value is less than the maximum credit as a result of the comparison. The performance manager 240 may provide the program command to the ninth die, and thereafter update the program issue command value of the issue command information from 0 to 1.

Figure 10:
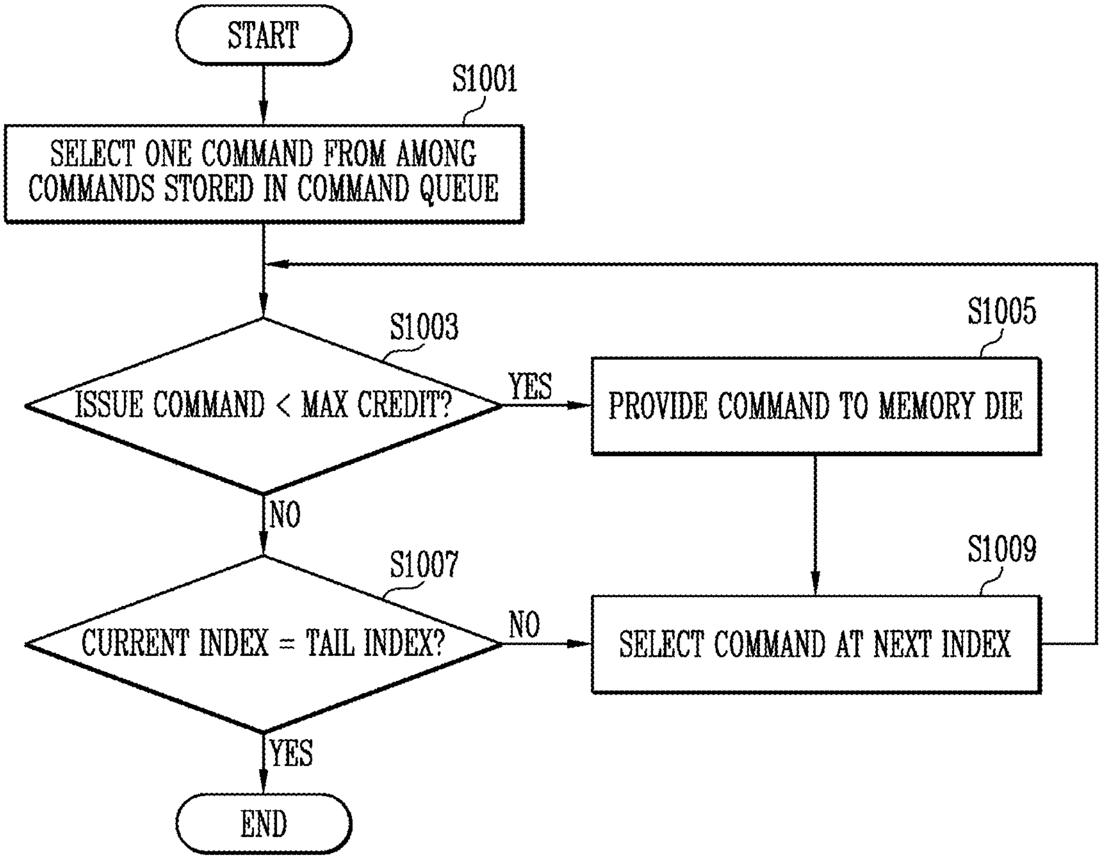
FIG. 10 is a flowchart illustrating the operation of a controller according to an embodiment of the present disclosure.

FIG. 10 is a flowchart illustrating the operation of a controller according to an embodiment of the present disclosure.

Referring to FIG. 10, at S1001, the controller may select one from among commands stored in a command queue. In detail, the controller may select a command corresponding to the head index of the command queue.

At S1003, the controller may compare an issue command value with a maximum (max) credit for the same type of commands as the type of the selected command. The issue command value may indicate the number of the same type of commands provided to memory dies as the type of the selected command. When it is determined that the issue command value is less than the maximum credit (S1103, YES), the controller may proceed to S1005. Otherwise, the controller may proceed to S1007.

At S1005, the controller may provide the selected command to a memory die which is to perform the selected command.

At S1007, the controller may determine whether the current index is identical to a tail index. When it is determined that the current index is identical to the tail index (S1007, YES), the controller may terminate the operation. However, the term "termination of the operation" may mean that one operation of outputting the command from the command queue is terminated, and the controller may return to S1001 to perform the operation of outputting an additionally input command.

When it is determined that the current index is not identical to the tail index (S1007, NO), the controller may proceed to S1009.

At S1009, the controller may select a command stored at the next index of the command queue.

Thereafter, the controller may repeatedly perform operations S1003 to S1009 until the selected current index reaches the tail index.

Figure 11:
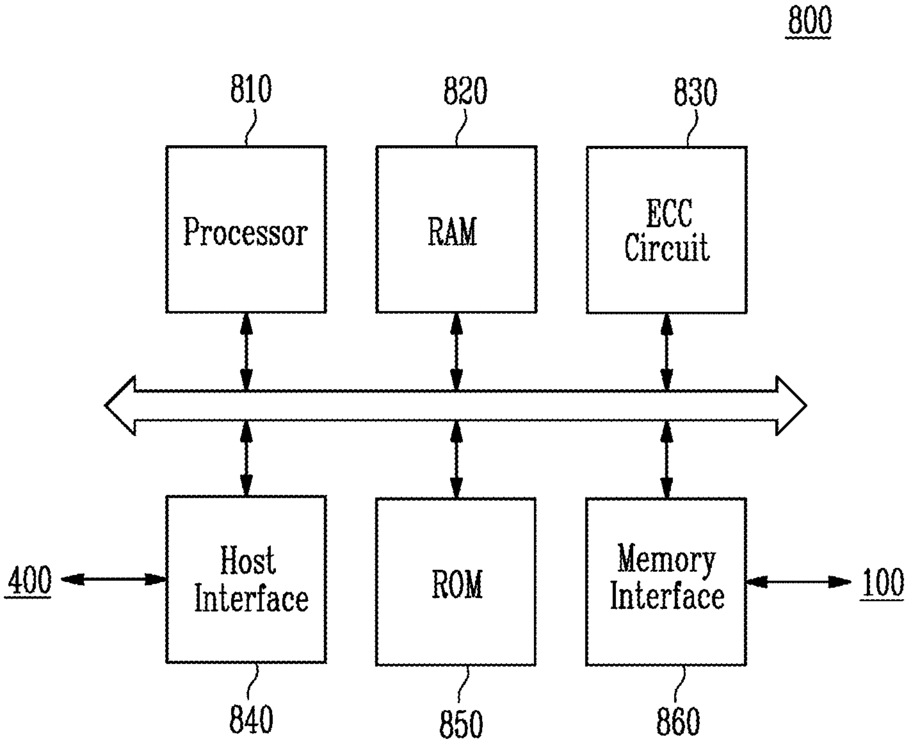
FIG. 11 is a diagram illustrating the controller of FIG. 1 according to an embodiment of the present disclosure.

FIG. 11 is a diagram illustrating the controller of FIG. 1 according to an embodiment of the present disclosure.

Referring to FIG. 11, a memory controller 800 may include a processor 810, a random access memory (RAM) 820, an error correction circuit 830, a host interface 840, a read only memory (ROM) 850, and a memory interface 860. The memory controller 800 may be the controller 200, described above with reference to FIG. 1.

The processor 810 may control the overall operation of the memory controller 800. The RAM 820 may be used as a buffer memory, a cache memory or a working memory of the memory controller 800. The command generator 210, the command queue 220, and the performance manager 240, described above with reference to FIG. 3, may be stored in the ROM 850 or the RAM 820 in the form of software executed by the processor 810. Further, the credit information generator 230 may be included in the RAM 820.

In an embodiment, the ROM 850 may store various types of information required for operating the memory controller 800 in the form of firmware.

The memory controller 800 may communicate with an external device (e.g., the host 400, an application processor or the like) through the host interface 840.

The memory controller 800 may communicate with the memory device 100 through the memory interface 860. The memory controller 800 may transmit, to the memory device 100, a command CMD, an address ADDR, a control signal CTRL, or the like and receive data DATA from the memory device 100, through the memory interface 860.

Figure 12:
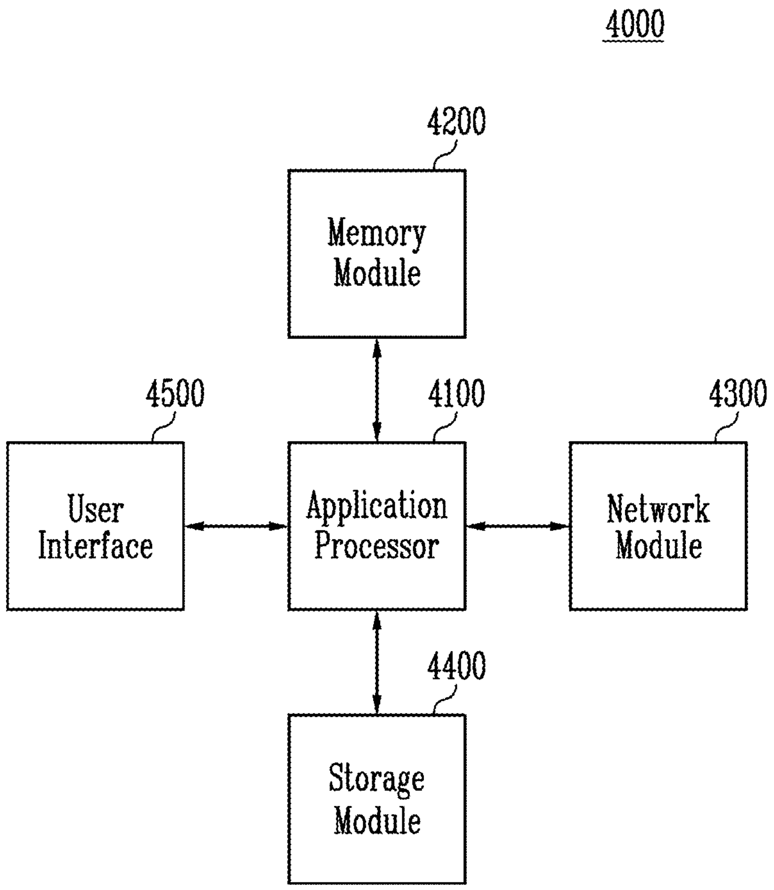
FIG. 12 is a block diagram illustrating a user system to which a data storage device according to an embodiment of the present disclosure is applied.

FIG. 12 is a block diagram illustrating a user system to which a data storage device according to an embodiment of the present disclosure is applied.

Referring to FIG. 12, a user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PCM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as code division multiple access (CDMA), a global system for mobile communication (GSM), wideband CDMA (WCDMA), CDMA-2000, time division multiple access (TDMA), long term evolution (LTE), WiMAX, WLAN, UWB, Bluetooth, or Wi-Fi. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be the data storage device 50, described above with reference to FIG. 1. Alternatively, in various embodiments, the storage module 4400 may be provided as a removable storage medium (removable drive), such as a memory card or an external drive of the user system 4000.

In an embodiment, the storage module 4400 may include a plurality of nonvolatile memory devices, each of which may be operated in the same manner as the memory device 100, described above with reference to FIG. 1. The storage module 4400 may be operated in the same manner as the data storage device 50, described above with reference to FIG. 1.

The user interface 4500 may include interfaces which input data or instructions to the application processor 4100 or output data to external devices. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

The present disclosure may provide a data storage device for efficiently controlling performance and a method of operating the data storage device.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations, one or more features from a combination can in some cases be excised from the combination, and the combination may be directed to a sub-combination or variation of a sub-combination. Furthermore, the embodiments may be combined to form additional embodiments.

What is claimed is:

1. A data storage device comprising:

a plurality of memory dies;

a command storage configured to store commands;

a credit information generator configured to generate and store maximum credit information indicating a maximum number of the commands that the plurality of memory dies are capable of processing simultaneously for each command type; and a performance manager configured to provide the commands to the plurality of memory dies to process a limited number of the commands less than or equal to the maximum credit information corresponding to the each command type.

2. The data storage device according to claim 1, wherein the credit information generator stores issue command information indicating the limited number of the commands provided to the plurality of memory dies depending on the each command type.

3. The data storage device according to claim 2, wherein the performance manager selectively provides the commands to the plurality of memory dies based on a result of comparing the issue command information with the maximum credit information.

4. The data storage device according to claim 2, wherein the performance manager provides one of the commands stored in the command storage to the plurality of memory dies, and updates the issue command information.

5. The data storage device according to claim 4, wherein the performance manager receives a completion response indicating that processing of the one command has been completed from each of the plurality of memory dies, and updates the issue command information based on the completion response.

6. The data storage device according to claim 2, wherein the command storage comprises a circular queue in which the commands are stored in storage spaces indicated by sequentially increasing indices and respectively corresponding to the indices.

7. The data storage device according to claim 6, further comprising:

a command generator configured to generate a command corresponding to one or more operations to be performed by the plurality of memory dies and input the generated command to a storage space corresponding to a tail index indicating a last index among the indices.

8. The data storage device according to claim 6, wherein the performance manager selects each of the commands stored in storage spaces respectively corresponding to the indices while increasing the indices from a position designated as a head index among the indices, and provides the selected command to a selected memory die among the plurality of memory dies when maximum credit information corresponding to a type of the selected command is greater than the issue command information.

9. The data storage device according to claim 1, wherein the credit information generator generates the maximum credit information to include first maximum credit information and second maximum credit information having a value less than a value of the first maximum credit information.

10. The data storage device according to claim 9, wherein the performance manager uses the second maximum credit information as the maximum credit information when a temperature of each of the plurality of memory dies is greater than a reference temperature.

11. The data storage device according to claim 9, wherein the performance manager uses the first maximum credit information as the maximum credit information when a temperature of each of the plurality of memory dies is less than or equal to a reference temperature.

12. The data storage device according to claim 9, wherein the credit information generator is configured to:

generate the first maximum credit information to include first program maximum credit information, first read maximum credit information, and first erase maximum credit information, and generate the second maximum credit information to include second program maximum credit information, second read maximum credit information, and second erase maximum credit information that have values less than values of the first program maximum credit information, the first read maximum credit information, and the first erase maximum credit information, respectively.

13. The data storage device according to claim 12, wherein the credit information generator generates the first read maximum credit information to have a value less than a value of the first program maximum credit information.

14. The data storage device according to claim 12, wherein the credit information generator generates the second read maximum credit information to have a value less than a value of the second program maximum credit information.

15. A data storage device comprising:

a plurality of memory dies;

a command storage configured to store commands;

a credit information generator configured to store first maximum credit information indicating a maximum number of the commands that the plurality of memory dies are capable of processing simultaneously for each command type and second maximum credit information less than the first maximum credit information; and a performance manager configured to provide a limited number of the commands to the plurality of memory dies based on one of the first maximum credit information and the second maximum credit information depending on a temperature of each of the plurality of memory dies.

16. The data storage device according to claim 15, wherein the first maximum credit information includes first program maximum credit information, first read maximum credit information, and first erase maximum credit information depending on types of the commands.

17. The data storage device according to claim 16, wherein the second maximum credit information includes second program maximum credit information, second read maximum credit information, and second erase maximum credit information depending on the types of the commands.

18. The data storage device according to claim 17, wherein the credit information generator generates the second program maximum credit information, the second read maximum credit information, and the second erase maximum credit information that have values less than values of the first program maximum credit information, the first read maximum credit information, and the first erase maximum credit information, respectively.

19. The data storage device according to claim 15, wherein the performance manager controls the plurality of memory dies based on the first maximum credit information when the temperature is less than or equal to a reference temperature, and controls the plurality of memory dies based on the second maximum credit information when the temperature is greater than the reference temperature.

20. A controller comprising:

a host interface configured to communicate with a host;

a memory interface configured to communicate with a memory device; and a processor configured to control the host interface and the memory interface, wherein the processor is configured to:

generate a plurality of commands, each command corresponding to a request received from the host, and control the memory interface to provide the generated commands to the memory device based on maximum credit information indicating a maximum number of the commands that the memory device is capable of processing simultaneously for each command type, and issue command information indicating a limited number of the commands for the each command type.

* * * * *